(12) United States Patent
Matsubara et al.

(10) Patent No.: US 8,862,700 B2
(45) Date of Patent: Oct. 14, 2014

(54) DATA SERVER, SYSTEM, AND DATA TRANSFER BANDWIDTH CONTROL METHOD

(75) Inventors: Daisuke Matsubara, Yokohama (JP); Hitoshi Yabusaki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/363,452

(22) Filed: Feb. 1, 2012

(65) Prior Publication Data
US 2012/0246276 A1 Sep. 27, 2012

(30) Foreign Application Priority Data
Mar. 22, 2011 (JP) .................. 2011-061879

(51) Int. Cl.
G06F 15/16 (2006.01)
H04L 12/931 (2013.01)
H04L 12/859 (2013.01)
H04L 12/923 (2013.01)
H04L 12/815 (2013.01)

(52) U.S. Cl.
CPC ............ *H04L 49/35* (2013.01); *H04L 47/2475* (2013.01); *H04L 47/762* (2013.01); *H04L 47/22* (2013.01)
USPC ........................................ 709/219

(58) Field of Classification Search
USPC ........................................ 709/219
See application file for complete search history.

(56) References Cited

U.S. PATENT DOCUMENTS 5,400,329 A * 3/1995 Tokura et al. ................. 370/232
5,781,531 A * 7/1998 Charny ......................... 370/232
2003/0037158 A1 * 2/2003 Yano et al. .................... 709/232
2004/0064576 A1 * 4/2004 Goldhor et al. ............... 709/232
2008/0117829 A1 * 5/2008 Nakano et al. ................ 370/247

FOREIGN PATENT DOCUMENTS

| JP | 200211858 | | 4/2002 | |
| JP | 2006-245992 A | | 9/2006 | |
| JP | 2006245992 A | * | 9/2006 | |
| JP | 2007074218 | | 3/2007 | |
| WO | WO 2010089886 A1 | * | 8/2010 | |
| WO | 2010/109767 A1 | | 9/2010 | |
| WO | WO 2010109767 A1 | * | 9/2010 | ............. H04L 12/56 |
| WO | WO 2010113408 A1 | * | 10/2010 | |

OTHER PUBLICATIONS

C. Kenjiro, "QoS in the Internet—Control Technology—Diffserv", Internet Week 99, Pacifico Yokohama, Dec. 14, 1999, 21 pp.
Y. Sawa et al, "Delay Reduction Method in Wide-Area Network Communication using Path Selection", Institute of Electronics, Information and Communication Engineers, Technical Committee on New Generation Network, Aug. 17, 2010, 6 pp.

* cited by examiner

Primary Examiner — Brian J Gillis
Assistant Examiner — Shean Tokuta
(74) Attorney, Agent, or Firm — Mattingly & Malur, PC

(57) ABSTRACT

A data synchronization system transfers data between multiple data synchronization servers connected to a network path. The data synchronization server calculates a transfer delay on a network path involved in the transfer of data of multiple applications in an application server to another data synchronization server, predicts a time at which the transfer delay will exceed the requested delay of each application, and controls the transmission rate of data for each application so that times, at which the transfer delays will exceed the requested delays of all applications, become the same. In this way, the data synchronization system controls the data synchronization of applications between remotely installed distributed data centers so that the requested delay of each application is satisfied as much as possible.

9 Claims, 8 Drawing Sheets

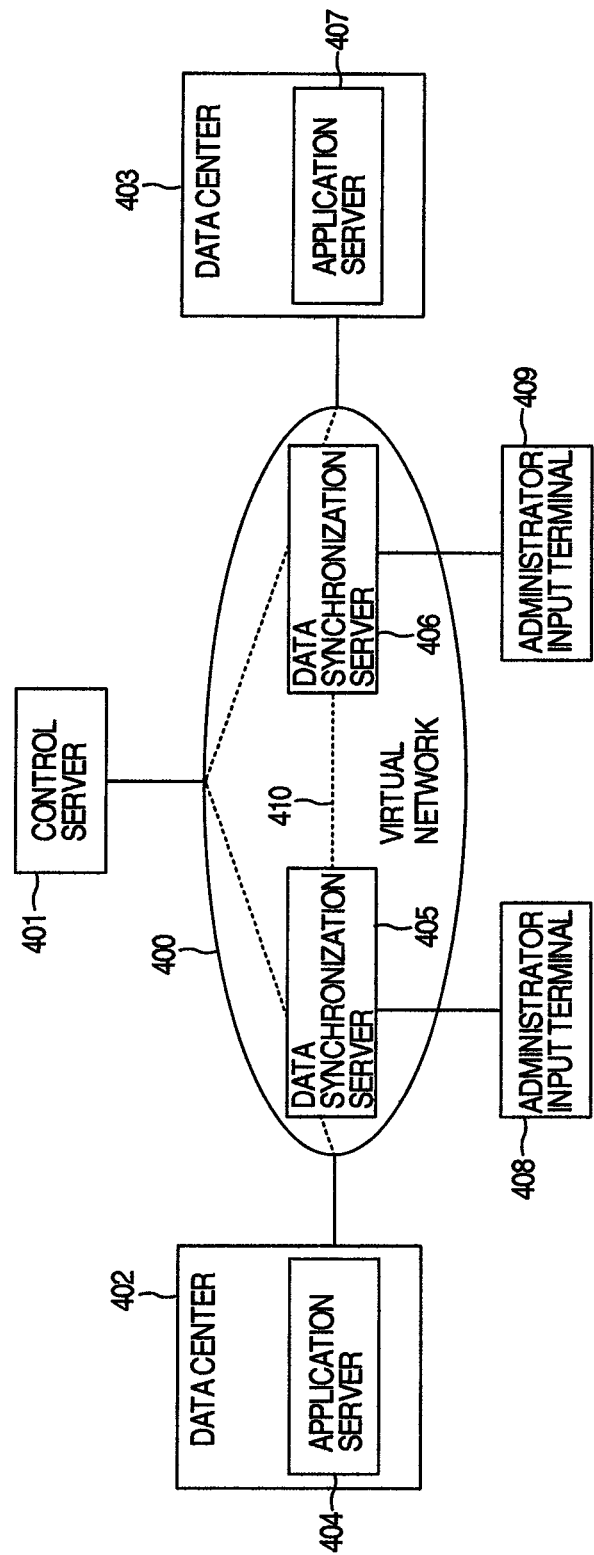

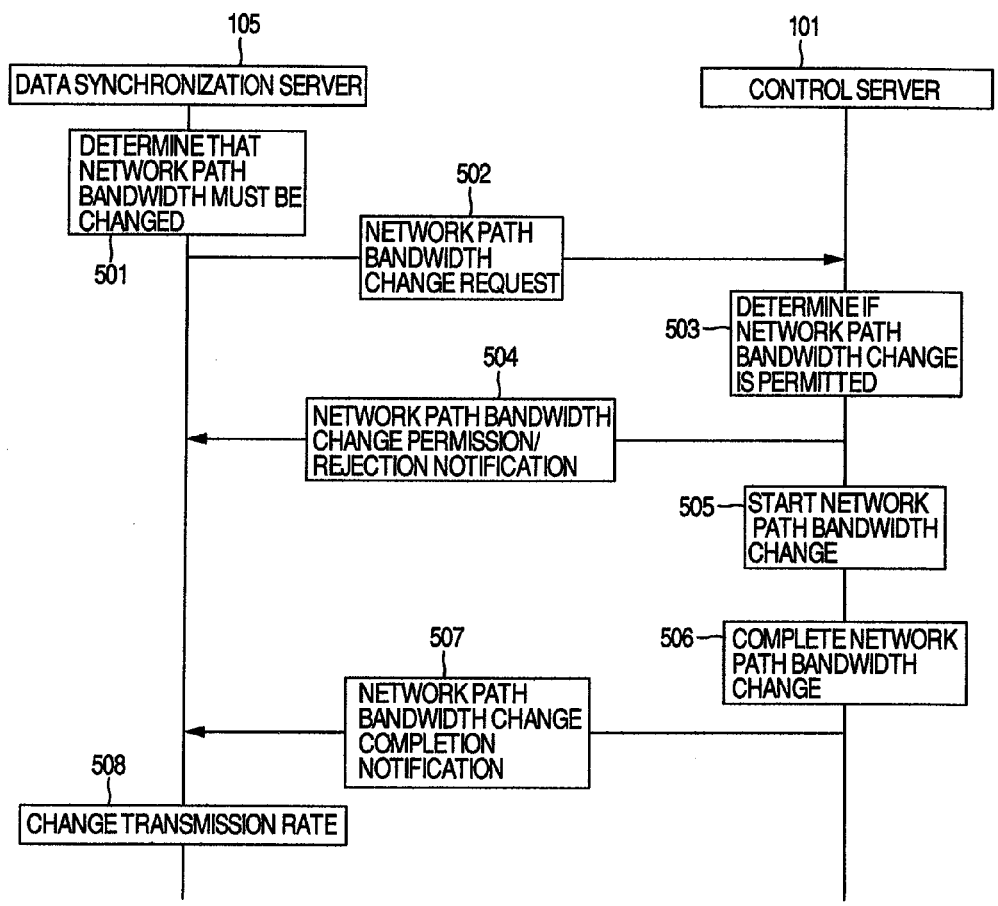
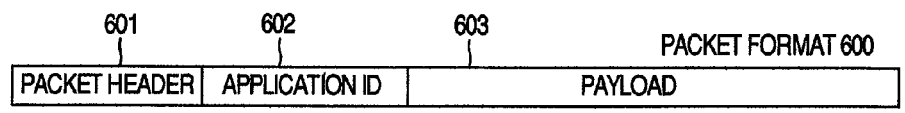

FIG. 7

INFLOW AMOUNT OBSERVATION DATA STORAGE UNIT TABLE 700

| APPLICATION ID | INFLOW AMOUNT (kbps) |
|---|---|
| 001 | 100 |
| 002 | 130 |
| 003 | 150 |
| 004 | 160 |
| 005 | 110 |
| 006 | 120 |

FIG. 8

BUFFER ACCUMULATION AMOUNT OBSERVATION DATA STORAGE UNIT TABLE 800

| APPLICATION ID | ACCUMULATION AMOUNT (KB) |
|---|---|
| 001 | 10 |
| 002 | 110 |
| 003 | 50 |
| 004 | 200 |
| 005 | 30 |
| 006 | 0 |

FIG. 9

SETTING VALUE STORAGE UNIT TABLE 900

| APPLICATION ID (901) | REQUESTED DELAY (msec) (902) |
|---|---|
| 001 | 10 |
| 002 | 100 |
| 003 | 5000 |
| 004 | 200 |
| 005 | 50 |
| 006 | 20 |

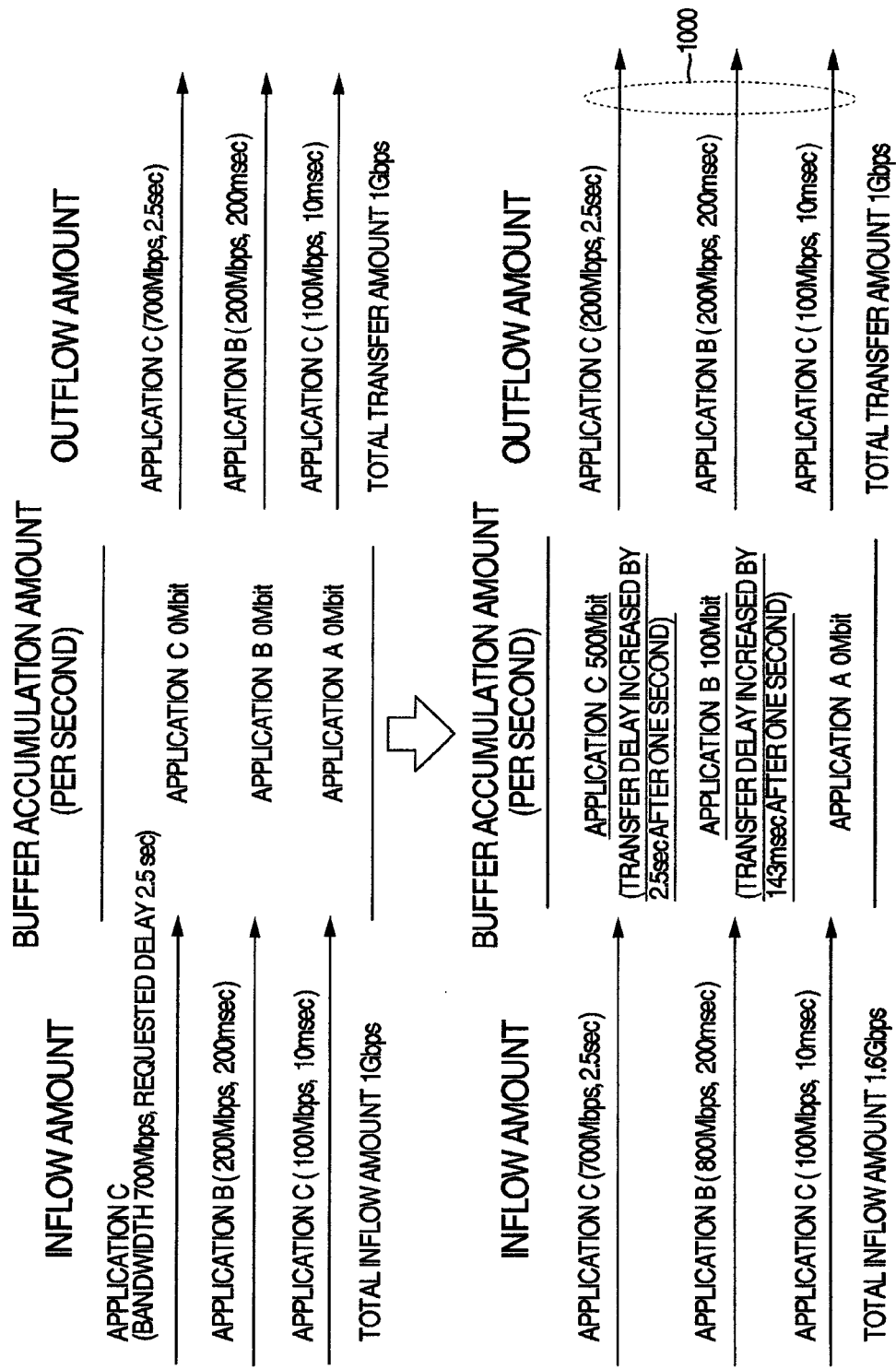

ial application, No. 2011-061879 filed on Mar. 22, 2011, the

DATA SERVER, SYSTEM, AND DATA TRANSFER BANDWIDTH CONTROL METHOD

INCORPORATION BY REFERENCE

This application claims priority based on a Japanese patent application, No. 2011-061879 filed on Mar. 22, 2011, the entire contents of which are incorporated herein by reference.

BACKGROUND

The subject matter discussed herein relates to a data synchronization system, and more particularly to a technology for maintaining the data synchronization of applications among remotely installed distributed data centers.

Recently, to perform disaster recovery and grid calculation, there is an increasing need for data synchronization among remotely installed, distributed data centers, which communicate over a network, using data synchronization servers. On the other hand, attention has been paid to, and study has been conducted on, the "network virtualization technology" used for building a next-generation network. The network virtualization technology is characterized in the guaranteed quality of communication where a communication delay is taken into consideration and in the efficient use of network resources achieved by changing the bandwidth of a virtual network.

To achieve efficient use of network resources, the methods such as the Priority Queuing (PQ) method and the Weighted Fair Queuing (WFQ) method are conventionally known (see Chou Kenjiro, "QoS in the Internet—Control technology~Diffserv", Internet Week 99, Pacifico Yokohama, Dec. 14, 1999). A delay reduction method for use in a wide area network (WAN) communication where a route is selected for each application is also studied (see Sawa Yuta et al., "Proposal and evaluation of delay reduction method in wide area network communication using route selection", Workshop 2010, Institute of Electronics, Information and Communication Engineers, Technical Committee on New Generation Network, Aug. 17, 2010). The related patent documents are JP-A-2006-245992 that describes a communication device that reflects the delay time of data, which remains in the buffer memory, on the communication control and International Publication WO2010-109767 that describes a data synchronization system that calculates and sets a network path for connecting synchronization servers, a bandwidth, and an allowable delay for establishing data synchronization between wide-area locations.

SUMMARY

On the Internet, one of the current networks on which various types of information are transferred, a sudden change in the inflow amount of data, such as burst traffic, sometimes causes a data delay and a data packet loss. On the other hand, the average bandwidth usage rate of a leased line or a Virtual Private Network (VPN) is 10% or lower, because over-provisioning is performed to solve the problems described above.

In addition, a data synchronization server between remotely installed distributed data centers requires that the transmission rate be controlled appropriately to satisfy the requested delay of each application. However, the PQ method described above, where higher-priority data is always transferred preferentially, cannot solve the problem that will arise when the inflow amount of data of an application, belonging to a low-priority class, increases suddenly and therefore the transfer delay increases suddenly. The WFQ method described above, where the outflow amount rate, which is the data transmission rate of an application belonging to each class, is set equal to the inflow amount rate on a class basis, has the problem that the transfer delay of a higher-priority class readily exceeds the requested delay and therefore the requested delay cannot be satisfied appropriately.

In view of the foregoing, a data synchronization server, a system, and a data transfer bandwidth control method are disclosed that can satisfy the requested delay of each application and each class as much as possible.

More specifically, a data synchronization server, a data synchronization system that uses the data synchronization server, and a data transfer bandwidth control method used in the data synchronization server are disclosed. The data synchronization server transfers data to and from another data synchronization server connected to a network path and comprises a processing unit and a storage unit having a buffer in which data is accumulated for each of a plurality of applications wherein the processing unit calculates a transfer delay, involved in a transfer of data for each of the plurality of applications that use the network path, to control a transmission rate of data from the buffer for each of the applications so that a requested delay of each of the plurality of applications is satisfied.

Also, a data synchronization server, a data synchronization system are disclosed that uses the server, and a data transfer bandwidth control method used in the server. In the data synchronization server, the processing unit predicts a time, at which a delay involved in data transfer for each of the plurality of applications will exceed the requested delay of data for each of the applications, from the calculated transfer delay and controls the transmission rate of data for each of the plurality of applications so that predicted times, at which the transfer delays of data of all applications will exceed the requested delays, become the same.

Also, a data synchronization server, a data synchronization system are disclosed that uses the server, and a data transfer bandwidth control method used in the server. In the data synchronization server, the processing unit predicts a time at which the sum of the transmission rates of data of the plurality of applications will exceed a bandwidth assigned to the network path and, before the predicted time at which the sum will exceed the bandwidth, transmits a network path bandwidth change request to a control server that controls the network path.

When the inflow amount of data of each application changes in an environment where traffic varies, the disclosed sever, system and method can delay the time, at which the requested delay is not satisfied (delay failure), as much as possible. By predicting the transfer delay of data of each application, a request to increase the bandwidth may be made in advance.

These and other benefits are described throughout the present specification. A further understanding of the nature and advantages of the teachings may be realized by reference to the remaining portions of the specification and the attached drawings.

BRIEF DESCRIPTION OF THE DRAWINGS

FIG. 4 is a diagram showing another example of the general configuration of the data synchronization system in the first embodiment.

FIG. 5 is a diagram showing an example of the processing flow in which a request to change the path bandwidth is made in the first embodiment.

FIG. 6 is a diagram showing an example of the format of a data packet used in the data synchronization system in the first embodiment.

FIG. 7 is a diagram showing an example of the inflow amount table in the inflow amount observation data storage unit in the data synchronization system in the first embodiment.

FIG. 8 is a diagram showing an example of the accumulation amount table in the buffer accumulation amount observation data storage unit in the data synchronization system in the first embodiment.

FIG. 9 is a diagram showing an example of the requested delay table in the setting value storage unit in the data synchronization system in the first embodiment.

FIG. 10 is a diagram schematically showing the effect of the disclosed data synchronization system.

DETAILED DESCRIPTION OF THE EMBODIMENTS

Embodiments will be described with reference to the drawings. In this specification, a communication path via which data is transferred in a physical network or a virtual network is called a network path, or simply a path. A data synchronization server in this specification refers to a server that stores data in, or retrieves data from, its own storage unit in response to a data storage request or a data acquisition request from an application server and, in addition, sets the value of stored data to the same value of data stored in another data synchronization server specified for each application. This data synchronization server functions as a data synchronization device in a data synchronization system.

[First Embodiment]

Figure 1:
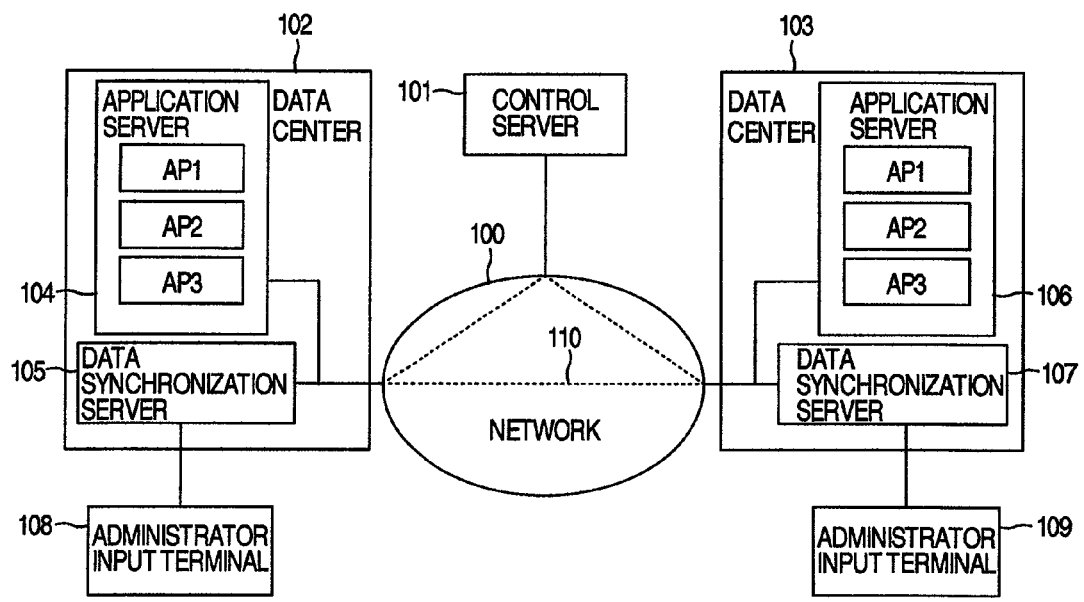
FIG. 1 is a diagram showing an example of the general configuration of a data synchronization system in a first embodiment.

FIG. 1 is a diagram showing an example of the general configuration of a data synchronization system in a first embodiment. Referring to the figure, the data synchronization system includes a control server 101, a distributed data center 102, and a distributed data center 103, all of which are interconnected via a path 110 on a network 100. The network 100, composed of one or more Wide Area Networks (WAN), internally includes transfer devices such as a switch, a router, and a transmission device. As described above, the path 110 is a network path formed using a physical network or a virtual network and any means may be used to form a path. The number of distributed data centers 102 and 103 is not limited to two but any number of distributed data centers may be connected.

The data centers 102 and 103 include application servers 104 and 106 and data synchronization servers 105 and 107, respectively, and administrator input terminals 108 and 109 are connected to the data synchronization servers. The administrator input terminals 108 and 109 are used by an administrator to use and manage each data center. Multiple applications AP1, AP2, and AP3 operate on each of the application servers 104 and 106. The applications that operate on the application servers 104 and 106 may be the same applications or different applications. In either case, the data of the multiple applications AP1, AP2, and AP3 is transferred via the path 110. Any type of applications may operate on the application servers. Examples of the applications include an application for collecting in-vehicle sensor data in a mobile application server, an application for collecting data from an earthquake sensor, and an application for collecting the images from a monitor camera.

The control server 101, application servers 104 and 106, data synchronization servers 105 and 107 that function as a data synchronization device, and administrator input terminals 108 and 109, which are shown in FIG. 1, are all configured by a computer device having the communication interface. This computer device includes a processing unit configured by a Central Processing Unit (CPU), a storage unit such as a semiconductor memory and a Hard Disk Drive (HDD), and a communication interface (IF), all of which are interconnected by the internal bus. The data synchronization servers 105 and 107 can change the transmission rates of multiple applications within the bandwidth of the path 110. To change the entire bandwidth of the path 110, the data synchronization servers 105 and 107 must transmit a change request to the control server 101 in advance.

FIG. 1 is a diagram showing an example of the configuration of the data synchronization system. It is of course possible to apply this embodiment to another configuration such as the configuration of the data synchronization system shown in FIG. 4.

The data synchronization system in FIG. 4 includes a virtual network 400, a control server 401, data centers 402 and 403, application servers 404 and 407, data synchronization servers 405 and 406, administrator input terminals 408 and 409, and a network path 410. As shown in the figure, the configuration of this data synchronization system is that the data synchronization servers, each of which work as a data synchronization device, are not in the data centers 402 and 403, but in the virtual network 400. Although not shown, various applications operate in the application servers 404 and 407 as in the system in FIG. 1. Although the following describes the processing operation of the system in this embodiment with emphasis on the data synchronization system shown in FIG. 1, the same processing is performed in the data synchronization system shown in FIG. 4.

Figure 2:
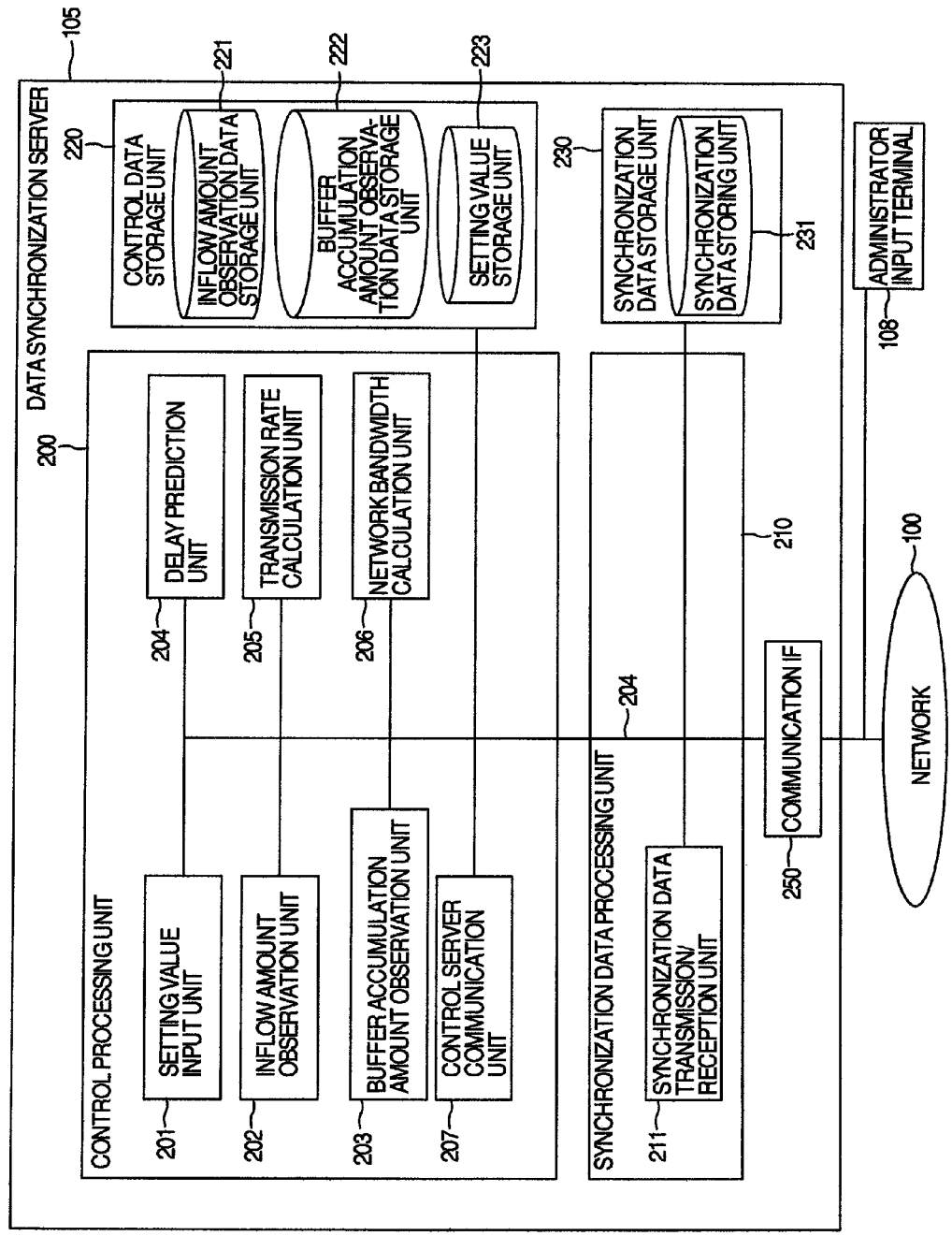
FIG. 2 is a block diagram showing an example of the configuration of a data synchronization server in the first embodiment.

FIG. 2 is a diagram showing an example of the configuration of the data synchronization servers 105 and 107 each of which functions as a data synchronization device in the first embodiment. Although the data synchronization server 105 is used as an example in the description below for the sake of description, the data synchronization server 107 has the same configuration. As shown in the figure, the data synchronization server 105 in this embodiment has the configuration of an ordinary computer as described above. That is, the data synchronization server 105 includes a control processing unit 200, a synchronization data processing unit 210, a control data storage unit 220, a synchronization data storage unit 230, and a communication interface IF 250, all of which are interconnected by an internal bus 240. The control processing unit 200 and the synchronization data processing unit 210 are each configured by one or more CPUs.

The control processing unit 200 includes the function blocks such as a setting value input unit 201, an inflow amount observation unit 202, a buffer accumulation amount observation unit 203, a delay prediction unit 204, a transmission rate calculation unit 205, a network bandwidth calculation unit 206, and a control server communication unit 207. These functional blocks may be provided by the functional programs executed by a processing unit such as the CPU. The control data storage unit 220 includes an inflow amount observation data storage unit 221, a buffer accumulation amount observation data storage unit 222, and a setting value storage unit 223 to store various tables.

In the data synchronization system shown in FIG. 1, the application server 104 in the data center 102 first transmits the synchronization data about an internally operating application to the data synchronization server 105. This synchronization data is transmitted to a synchronization data transmission/reception unit 211 in the synchronization data processing unit 210 via the internal bus 240 in the data synchronization server 105. The synchronization data transmission/reception unit 211 stores the synchronization data in a synchronization data storing unit 231 in the synchronization data storage unit 230. At the same time, the synchronization data transmission/reception unit 211 transmits this synchronization data to the data synchronization server 107 in another data center 103 via the communication IF 250. The transmitted synchronization data is received by the synchronization data transmission/reception unit 211 via the network path 110 and via the communication IF 250 of the data synchronization server 107 and then stored in the synchronization data storing unit 231.

Next, the following describes the operation processing of the control processing unit 200 of the data synchronization server 105 shown in FIG. 2. The system administrator enters requested-delay data of each application from the administrator input terminal 108. The entered requested-delay data is transmitted to the setting value input unit 201 via the communication IF 250. The setting value input unit 201 stores the entered requested-delay data in the table, which will be described later with reference to FIG. 9, in the setting value storage unit 223 in the control data storage unit 220.

Next, the inflow amount observation unit 202 transmits an inquiry to the synchronization data storing unit 231 in the synchronization data storage unit 230 as necessary, for example, every second, to acquire the inflow amount of synchronization data received from each application. The inflow amount is, for example, the amount of synchronization data, newly stored per unit time, for each application. The inflow amount observation unit 202 records the acquired inflow amount of each application in the table, which will be described later with reference to FIG. 7, in the inflow amount observation data storage unit 221. On the other hand, the buffer accumulation amount observation unit 203 also transmits an inquiry to the synchronization data storing unit 231 as necessary, for example, every second, to acquire the buffer accumulation amount, that is, the amount of synchronization data accumulated in the synchronization data storing unit 231, and records the acquired buffer accumulation amount in the table, which will be described later with reference to FIG. 8, in the buffer accumulation amount observation data storage unit 222.

Figure 3:
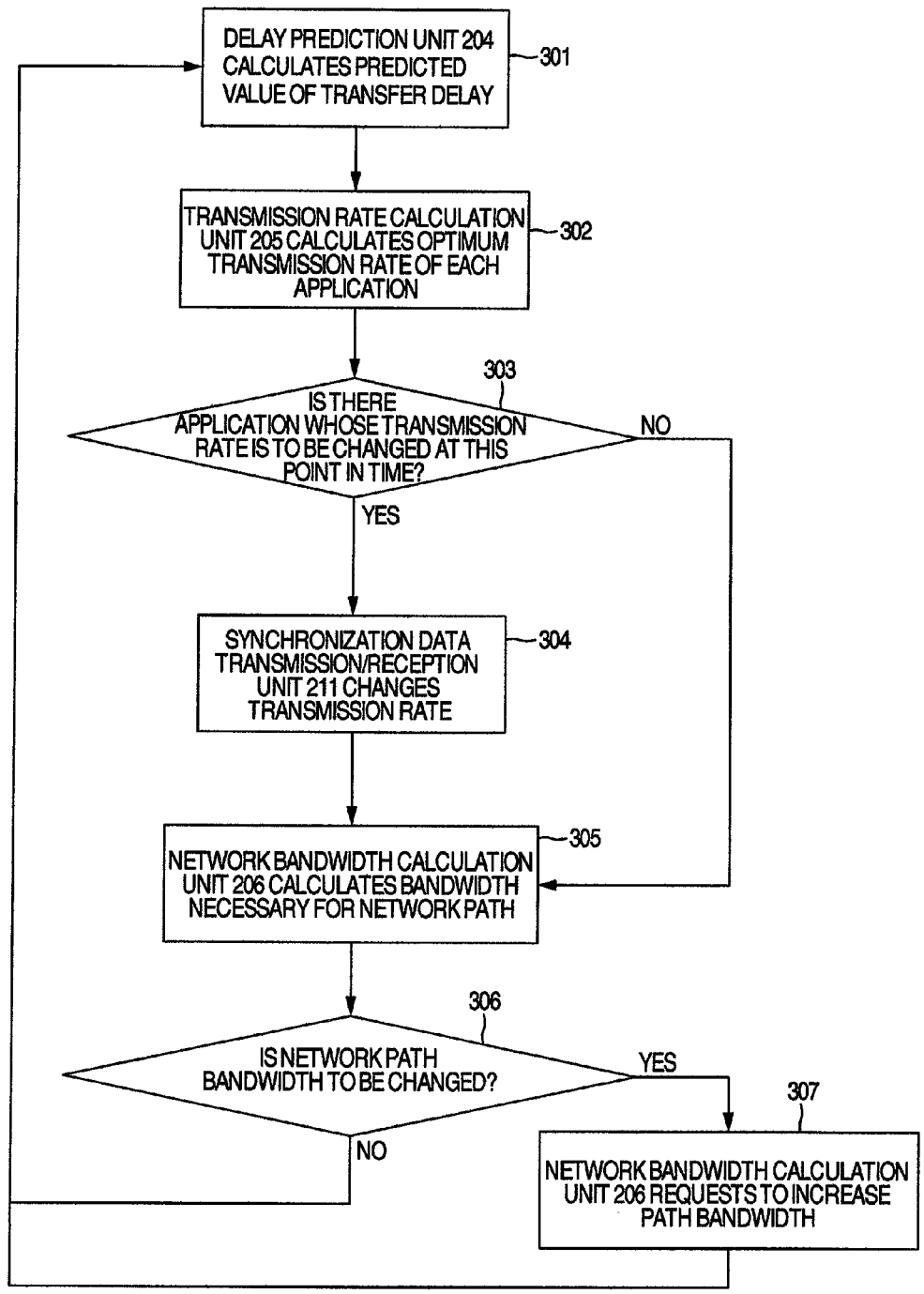
FIG. 3 is a diagram showing the flow of calculating the transfer delay of data of each application in the first embodiment.

FIG. 3 is a flowchart showing the calculation flow in which the control processing unit 200 of the data synchronization server 105 in FIG. 2 in this embodiment calculates the transfer delay of data of each application on the network path 110.

In step 301 in FIG. 3, the delay prediction unit 204 of the control processing unit 200 starts the calculation of the predicted value of transfer delay. First, the delay prediction unit 204 acquires requested-delay data on the application from the setting value storage unit 223, acquires the inflow amount from the inflow amount observation data storage unit 221, and acquires the buffer accumulation amount from the buffer accumulation amount observation data storage unit 222. And, based on this information, the delay prediction unit 204 calculates the transfer delay of each application. An example of the transfer delay calculation method will be described later.

The delay prediction unit 204 transmits the calculated transfer delay to the transmission rate calculation unit 205.

In step 302, the transmission rate calculation unit 205 calculates the optimum transmission rate of each application. After that, the transmission rate calculation unit 205 determines in step 303 if there is a need to change the transmission rate of each application and, if so, transmits the transmission rate to the synchronization data transmission/reception unit 211 in step 304. Based on the received transmission rate, the synchronization data transmission/reception unit 211 changes the transmission rate of the synchronization data transferred from the data synchronization server 105 to the data synchronization server 107 over the network path 110.

In step 305, the transmission rate calculation unit 205 transmits the calculated transmission rate of each application to the network bandwidth calculation unit 206. The network bandwidth calculation unit 206 calculates the total of the transmission rate of the applications to find the bandwidth necessary for the network path 110.

In step 306, if it is determined in step 306 that the total bandwidth necessary for the network path 110 will exceed the bandwidth, currently assigned to the network path 110, in "a" minutes and therefore the bandwidth of the network path 110 must be changed, the network bandwidth calculation unit 206 outputs a request to change the bandwidth of the network path 110 to the control server 101 via the communication IF 250 in step 307.

FIG. 5 is a diagram showing an example of the processing flow in which the request to change the bandwidth of the network path 110 described above is transmitted from the network bandwidth calculation unit 206 of the data synchronization server 105 in the data synchronization system in this embodiment to the control server 101. In the figure, if it is determined in step 501 that the network path bandwidth must be changed, the data synchronization server 105 transmits a network path bandwidth change request 502 to the control server 101.

When the bandwidth change request 502 is received, the control server 101 determines in step 503 if the network path bandwidth change is permitted. The control server 101 returns a bandwidth change permission/rejection notification 504 that is the determination result and, if the change is permitted, starts changing the bandwidth of the network path 110 in step 505. When the network path bandwidth change is completed in step 506, the control server 101 transmits a network path bandwidth change completion notification 507 to the data synchronization server 105. When this network path bandwidth change completion notification 507 is received, the synchronization data transmission/reception unit 211 of the data synchronization server 105 changes the transmission rate of the network path 110 based on the network path bandwidth change completion notification 507 (step 508).

FIG. 6 is a diagram showing an example of the format of a data packet transmitted and received between the data centers via the network path of the data synchronization system in the first embodiment. As shown in the figure, a packet format 600 is composed of a packet header 601, an application identifier (ID) 602, and a payload 603. The application ID indicates to which application the data packet belongs.

FIG. 7, FIG. 8, and FIG. 9 show examples of the tables stored in the control data storage unit 220 of the data synchronization servers in the data synchronization system in the embodiment described above. FIG. 7 is a diagram showing the inflow amount observation data storage unit table that is stored in the inflow amount observation data storage unit 221 shown in FIG. 2. This table indicates an inflow amount 702 (kbps) corresponding to each application ID 701.

Similarly, FIG. 8 is a diagram showing the buffer accumulation amount observation data storage unit table stored in the buffer accumulation amount observation data storage unit 222 shown in FIG. 2. This table indicates an accumulation mount 802 (KB) corresponding to each application ID 801.

On the other hand, FIG. 9 is a diagram showing the setting value storage unit table stored in the setting value storage unit 223 shown in FIG. 2. This table indicates a requested delay 902 (msec) corresponding to each application ID 901.

The following describes an example of the transfer delay calculation method used in the delay prediction unit 204 of the control processing unit 200 of the data synchronization server 105 in FIG. 2 shown above. In this example, the transfer delay calculated for each application is calculated from the buffer delay amount and the transmission rate at which data is transmitted from the buffer.

First, using expression 1 given below, the data synchronization server predicts the buffer accumulation amount of each application at time t. The buffer accumulation amount is represented by the queue length.

$$A_{k,t} = A_{k,t0} + \int_{t0}^{t}(B_{t,in}(t) - B_{k,rate})dt \qquad [\text{Expreessoin1}]$$

where,
Ak, t: Queue length of application k at time t (unknown)
Ak,t0: Queue length of application k at time t0 (measured value)
Bk, in(t): Traffic amount of application k [bps] (unknown)
Bk, rate: Transmission rate [bps] of traffic of application k that data synchronization server transmits (known)

As described above, the data synchronization server in this embodiment calculates the transmission rate $B_{k,rate}'$ so that the times $t_k$, at which the requested delays of multiple applications (k=m+1 to n) which use the same network path and whose requested delay is longer than the control period cannot be satisfied ($A_k,t=A_{k,limit}$), become the same.

The time$_{tk}$ at which application k does not satisfy the requested delay is represented by expression 2 given below.

$$B'_{k,rate}(t - t_0) + A_{limit} - A_{k,t0} - \frac{1}{2}a_k(t^2 - t_0^2) - b_k(t - t_0) = 0 \qquad [\text{Expression 2}]$$

where (k=m+1−n), and the expression 3 given below holds.

$$\sum_{k=1}^{n} B'_{k,rate} = V_l \qquad [\text{Expression 3}]$$

$V_1$ is the bandwidth of a network path 1. Although this corresponds to the network path 110 in this embodiment, there may be multiple network paths in the network 100 other than the network path 110.

In the data synchronization servers in this embodiment, it is required that the times at which the requested delays of all applications cannot be satisfied be the same as described above and, therefore, $t_{m+1}=t_{m+2}=t_{m+3}=\ldots=tn\equiv t_{all}$. The data synchronization server calculates $B_{k,rate}'$(k=m+1 to n) that satisfies the expressions given above. Because the solution is found by solving the simultaneous nonlinear equations, the method such as the Newton-Raphson method may be used. As described above, the transfer delay for each application can be calculated in this embodiment.

The above description gives an example of the transfer delay calculation method for delaying a delay failure as much as possible while satisfying the requested delay for each application. Of course, the transfer delay calculation method for delaying a delay failure as much as possible while satisfying the requested delay for each application is not limited to the method described above in which the buffer delay amount and the transmission rate are used.

For example, the transfer delay involved in the data transfer can be calculated from the inflow amount of data into the buffer and the transmission rate for each application. This is because the data accumulation amount described above can be calculated from the difference between the integrated value of the inflow amount of data into the buffer (that is, total amount of data flowed into the buffer) and the integrated value of the transmission rate (that is, total amount of data transmitted so far). Conversely, because the integrated value of the data inflow amount can be calculated from the sum of the data accumulation amount and the integrated value of the transmission rate, the transfer delay can be calculated similarly. That is, by appropriately using the data inflow amount, the data accumulation amount in the buffer, and transmission rate for each application, the transfer delay involved in the data transfer can be calculated.

Although the transfer delay is calculated for each application in the above description, the transfer delay can also be calculated for each class to which the applications belong. In this case, the transfer delay is calculated considering the requested delay of each class to which one or more applications with the same bandwidth and the requested delay belong and, based on the calculated transfer delay, the data transfer bandwidth is controlled. The same calculation method may of course be used except that the transfer delay is calculated on a class basis.

The data synchronization system in this embodiment described above controls data transfer so that the requested delay is satisfied based on the predicted transfer delay, thereby controlling the data transfer in such a way the delay failure is delayed as much as possible.

FIG. 10 is a diagram showing the effect of the data synchronization system in the first embodiment. In the top, FIG. 10 shows the data inflow amount, buffer accumulation amount, and outflow amount of each application at a particular point in time. Note that the data outflow amount is equivalent to the data transfer bandwidth and the transmission rate. As shown in the figure, assume that application A has a bandwidth of 100 Mbps and a requested delay of 10 msec, application B has a bandwidth of 200 Mbps and a requested delay of 200 msec, and application C has a bandwidth of 700 Mbps and a requested delay of 2.5 sec and that the total inflow amount is 1 Gbps. At this point in time, also assume that the outflow amount, or the transmission rate, corresponding to each application has the same value as that of the inflow amount and, therefore, the buffer accumulation amount (per 1 sec) is all 0 (zero) Mbit.

From this state, assume that the total inflow amount is changed to 1.6 Gbps (the inflow amount of application A is 100 Mbps, the inflow amount of application B is 800 Mbps, and the inflow amount of application C is 700 Mbps) as shown in the bottom of FIG. 10. In this case, in the data synchronization system in this embodiment, the control processing unit 200 of the data synchronization server 105 in the data center 102 calculates the predicted value of the transfer delay as described above. The result is indicated by the buffer accumulation amount (per one second) in the bottom of FIG. 10. That is, after one second, the transfer delay of application B is predicted to increase by 143 msec, and that of application C by 2.5 sec; and the buffer accumulation amount is calculated as 0 (zero) Mbit for application A, 100 Mbits for application B, and 500M bits for application C.

In this case, the data synchronization system in this embodiment controls the data transfer so that the outflow amount of data from the applications to the network path becomes 1000 Mbps (that is, 1 Gbps), that is, the transmission rate of application A is 100 Mbps, that of application B is 700 Mbps, and that of application C is 200 Mbps. By doing so, the data synchronization system in this embodiment can delay the delay failure as much as possible while satisfying the requested delay of all applications.

The same effect may be achieved when the same control is performed for class A, class B, and class C instead of application A, application B, and application C. In other words, the same effect may be achieved by appropriately controlling the transmission rate so that the transfer delay of the applications belonging to a class is satisfied on a class basis.

As described above in detail, the data synchronization system in this embodiment predicts the delay of each application or each class. When the traffic on the network path increases, the data synchronization system adjusts the data transfer bandwidth, or the transmission rate, of each application or class to delay the time, at which the transfer delay of data of all application or classes exceeds the requested delay (delay failure), as much as possible. Before that time arrives, the data synchronization server transmits a network-path bandwidth increase request to the control server of the network to prevent a delay failure from being generated.

The disclosed server, system and method are not limited to the embodiment described above but includes various modifications. For example, the embodiment is described in detail to make the present teachings easy to understand and, therefore, not all components in the description are always necessary. In addition, another component may be added to, or a component may be deleted or replaced in, a part of the configuration of the embodiment. For example, the data synchronization server in the embodiment, though described on the premise that there are remotely installed distributed data centers, may also be used as a data synchronization server, which controls the synchronization of synchronization data between application servers, in an environment where there is no data center.

The configuration, function, processing units, and processing means of each server described above may be implemented, in part or in whole, as hardware using integrated circuits. The information for implementing the functions, such as programs, tables, and files, may be stored not only in a memory or on a hard disk but on a recording device such as a solid state drive (SSD) or in a recording medium such as an IC card. It is of course possible to download the information via the network as necessary.

The disclosure is useful for a data synchronization system and is a particularly useful technology for maintaining the synchronization of application data between remotely installed distributed data centers.

The specification and drawings are, accordingly, to be regarded in an illustrative rather than a restrictive sense. It will, however, be evident that various modifications and changes may be made thereto without departing from the spirit and scope of the invention(s) as set forth in the claims.

We claim:

1. A data server that transmits data to another data server connected to a network path, comprising:
a plurality of buffers each of which accumulates data for a respective one of a plurality of applications; and
a processing unit which receives data from the applications to store the data into the respective buffers and transmits the stored data to the network path, wherein
the processing unit calculates a transmission delay which is a time period between when the data is received from each application and when the received data is transmitted to the network path,
predicts a time point when the calculated transmission delay of data from each application will exceed a transmission delay requested for data from the respective application,
controls transmission rates from the buffers such that the time points predicted for all the applications become the same and the transmission rates satisfy the requested transmission delays for the applications,
the data server is connected to a control server which controls the network path, and
the processing unit predicts a time point at which the sum of the transmission rates from the buffers would exceed a transmission delay requested for data from the respective application and requests the control server to change a bandwidth of the network path, before the predicted time point.

2. The data server according to claim 1, wherein
the processing unit calculates the transmission delay from an inflow amount of data received from each application into the buffers and the transmission rate.

3. The data server according to claim 1, wherein
the processing unit calculates the transmission delay from a data accumulation amount of data received from each application in the buffers and the transmission rate.

4. The data server according to claim 1, wherein
the processing unit calculates the transmission delay from an inflow amount of data received from each application into the buffer, a data accumulation amount of the buffer, and the transmission rate.

5. A data system, comprising:
a network path;
a control server controlling the network path; and
a plurality of data servers connected to the network path controlled by the control server,
wherein one or more of the data servers includes:
a plurality of buffers each of which accumulates data for a respective one of a plurality of applications, and
a processing unit which receives data from the applications to store the data into the respective buffers and transmits the stored data to the network path, and
the processing unit calculates a transmission delay which is a time period between when the data is received from each application and when the received data is transmitted to the network path,
predicts a time point when the calculated transmission delay of data from each application will exceed a transmission delay requested for data from the respective application,
controls the transmission rates from the buffers such that the time points predicted for all the applications become the same and the transmission rates satisfy the requested transmission delays for the applications, and
the processing unit of the data server predicts a time point at which the sum of the transmission rates from the buffers would exceed a transmission delay requested for data from the respective application and requests the control server to change a bandwidth of the network path, before the predicted time point.

6. The data system according to claim 5, wherein the processing unit of the data server calculates the transmission delay from an inflow amount of data received from each application into the buffers and the transmission rate.

7. The data system according to claim 5, wherein the processing unit of the data server calculates the transmission delay from a data accumulation amount of data received from each application in the buffers and the transmission rate.

8. The data system according to claim 5, wherein the processing unit of the data server calculates the transmission delay from an inflow amount of data received from each application into the buffers, a data accumulation amount of the buffer, and the transmission rate.

9. A data transfer bandwidth control method by a data server for transferring data to and from another data server connected to a network path, where the data server has a plurality of buffers each of which accumulates data for a respective one of a plurality of applications, the method comprising:

receiving data, by the data server, from the applications to store the data into the respective buffers;

transmitting, by the data server, the stored data to the network path;

calculating a transmission delay which is a time period between when the data is received from each application and when the received data is transmitted to the network path, predicting a time point when the calculated transmission delay of data from each application will exceed a transmission delay requested for data from the respective application;

controlling transmission rates from the buffers such that the time points predicted for all the applications become the same and the transmission rates satisfy the requested transmission delays for the applications; and predicting a time point at which the sum of the transmission rates from the buffers would exceed a transmission delay requested for data from the respective application and requests the control server to change a bandwidth of the network path, before the predicted time point.

* * * * *